United States Patent
Lemay et al.

(10) Patent No.: US 12,460,587 B2
(45) Date of Patent: Nov. 4, 2025

(54) METHOD FOR REGULATING THE SPEED OF ROTATION OF A PROPULSION DEVICE OF A HYBRID PROPULSION UNIT FOR AN AIRCRAFT, IN THE EVENT OF A FAILURE OF THE MAIN REGULATION SYSTEM OF THE HEAT ENGINE OF THE HYBRID PROPULSION UNIT

(71) Applicant: SAFRAN HELICOPTER ENGINES, Bordes (FR)

(72) Inventors: David Bernard Martin Lemay, Moissy-Cramayel (FR); Jean-Philippe Jacques Marin, Moissy-Cramayel (FR); Jean-Luc Charles Gilbert Frealle, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 50 days.

(21) Appl. No.: 18/718,701

(22) PCT Filed: Dec. 13, 2022

(86) PCT No.: PCT/FR2022/052330
§ 371 (c)(1),
(2) Date: Jun. 11, 2024

(87) PCT Pub. No.: WO2023/111445
PCT Pub. Date: Jun. 22, 2023

(65) Prior Publication Data
US 2025/0042563 A1    Feb. 6, 2025

(30) Foreign Application Priority Data
Dec. 17, 2021 (FR) ..................... 2113833

(51) Int. Cl.
*F02C 9/46* (2006.01)
*B64D 27/33* (2024.01)
(Continued)

(52) U.S. Cl.
CPC ............... *F02C 9/46* (2013.01); *B64D 27/33* (2024.01); *B64D 31/14* (2013.01); *B64D 31/18* (2024.01); *B64D 31/06* (2013.01)

(58) Field of Classification Search
CPC .......... F02C 9/46; B64D 27/33; B64D 31/14; B64D 31/18; B64D 31/06;
(Continued)

(56) References Cited

U.S. PATENT DOCUMENTS

| | | | |
|---|---|---|---|
| 11,760,495 B2 * | 9/2023 | Mark | .............. B64D 31/18 701/3 |
| 2002/0078692 A1 * | 6/2002 | Jay | .............. F02C 9/46 60/773 |

(Continued)

FOREIGN PATENT DOCUMENTS

| | | | |
|---|---|---|---|
| GB | 2078861 | * | 1/1982 |
| GB | 2078861 A | | 1/1982 |

(Continued)

OTHER PUBLICATIONS

International Search Report for PCT/FR2022/052330 dated Mar. 17, 2023.

*Primary Examiner* — Muhammad Shafi
(74) *Attorney, Agent, or Firm* — McDonald Hopkins LLC

(57) ABSTRACT

A method for regulating the speed of a propulsion device of an aircraft including: the propulsion device and a gearbox MGB; the heat engine and at least one electric motor, mounted in parallel on the MGB, the heat engine having a fuel circuit; main and backup regulation systems, and a regulation system, each capable of regulating the speed of (Continued)

the heat engine or the electric motor, respectively; a control system of the aircraft, capable of sending a speed or power setpoint to each of the regulation of the heat engine and the electric motor. The method includes: sending a speed setpoint $N_{M2ref}$ to the regulation system of the electric motor, the regulation system sending a power command $P_{M2*}$, to obtain an instantaneous power $P_{M2m}$; simultaneously, sending a speed or power command to the backup regulation system of the heat engine, the backup regulation system sending a selected fuel flow command QCarbAux* to the fuel circuit of the heat engine.

7 Claims, 4 Drawing Sheets

(51) Int. Cl.
 *B64D 31/14* (2006.01)
 *B64D 31/18* (2024.01)
 *B64D 31/06* (2006.01)

(58) Field of Classification Search
 CPC .......... F05D 2220/329; F05D 2220/90; F05D 2270/094; F05D 2270/304; F02K 5/00; B64C 27/12
 USPC ............................................................ 701/3
 See application file for complete search history.

(56) References Cited

U.S. PATENT DOCUMENTS

| 2002/0171005 | A1* | 11/2002 | Claudet | F02C 9/46 244/17.13 |
| 2016/0375994 | A1* | 12/2016 | Rossotto | B64D 31/18 701/3 |
| 2020/0277064 | A1* | 9/2020 | Thomassin | H02P 29/028 |
| 2020/0339268 | A1* | 10/2020 | Mark | B64C 11/00 |

FOREIGN PATENT DOCUMENTS

| WO | WO-0148574 | * | 7/2001 |
| WO | WO-2021001527 | * | 1/2021 |

* cited by examiner

METHOD FOR REGULATING THE SPEED OF ROTATION OF A PROPULSION DEVICE OF A HYBRID PROPULSION UNIT FOR AN AIRCRAFT, IN THE EVENT OF A FAILURE OF THE MAIN REGULATION SYSTEM OF THE HEAT ENGINE OF THE HYBRID PROPULSION UNIT

CROSS-REFERENCE TO RELATED APPLICATIONS

This is the National Stage application of PCT international application PCT/FR2022/052330, filed on Dec. 13, 2022, which claims the priority of French Patent Application No. 2113833, filed Dec. 17, 2021, both of which are incorporated herein by reference in their entireties.

TECHNICAL FIELD

The present invention relates to parallel hybrid propulsion units for aircraft. More particularly, the invention applies to propulsion and lift units of fixed- or rotary-wing aircraft (helicopter), or of vertical take-off and landing (VTOL, standing for "Vertical Take-Off and Landing aircraft" in English) aircraft. The invention may also apply to architectures of the type with multiple propulsion devices.

PRIOR ART

In a parallel hybrid propulsion unit, the propulsive power generation and supply means are redundant to enable landing of the aircraft under satisfactory safety conditions in the event of a partial failure of one power chain.

A characteristic example of application is a parallel hybrid propulsion unit of a helicopter, composed of a turboshaft engine and an electric motor both driving the main and anti-torque rotors.

An example of such a parallel hybrid propulsion unit is illustrated in FIG. 1. It includes:
- a main gearbox 3 (hereinafter MGB);
- a propulsion device 4, connected to the MGB; it may for example consist of a rotor, a propeller, a fan, etc.;
- a main heat engine (so-called engine 18), connected to the MGB and arranged so as to output mechanical power $P_{M1}$ to the MGB;
- an electric secondary motor (so-called motor 2), connected to the MGB and arranged so as to output mechanical power $P_{M2}$ to the MGB;
- a regulation system 5 of the engine 18 capable of regulating the rotational speed of the engine 1 via the command $P_{M1*}$;
- a regulation system 6 of the motor 2 capable of regulating the rotational speed of the motor 2 via the command $P_{M2*}$;
- a control system of the aircraft 7 which can communicate with the regulation systems of the two motors to send high-level commands thereto, such as the rotational speed setpoint $N_R^*$ of the propulsion device to be driven.

In fact, each regulation system of an engine is capable of regulating the mechanical power output by the engine to which it is connected, via the command $P_{M1*}$, in order to servo-control the rotational speed of the engine on a speed setpoint $N_R^*$.

Each of the motors is connected by a shaft 10 to the main gearbox 3, which will transmit the power from the motor(s) to the propulsion device 4.

The parameters of each motor (Parameters of the engine 18 and Parameters of the motor 2) are sent to their respective regulation systems.

The parallel hybrid architecture as schematized in FIG. 1 allows primarily overcoming the failure of the main heat engine (engine 18) and carrying out a clearance maneuver and/or an emergency landing thanks to the power output by the auxiliary electric motor (motor 2). In this case of failure, the main engine (engine 18) has a failure that no longer enables it to supply power to the main gearbox. A typical case of this type of failure is the stoppage of the main engine in flight, without the possibility of restarting it. Hence, the regulation system 5 of the failing engine 18 becomes inoperative. The power output to the MGB then originates solely from the power output by the auxiliary motor (motor 2), this power being controlled by the regulation system 6 of the motor 2, under the authority of the control system of the aircraft 7.

Yet, other types of failures might occur. In the context of the present invention, we focus on failures which affect the regulation system 5 of the main engine and which do not enable it to control the power output by the main engine 18. In this case, the engine 18 is generally always running and capable of outputting power, but the latter could no longer be regulated by the regulation system 5 of the engine 18. In general, we talk about a total regulation failure.

A known strategy in the world of helicopter turbines is then to lock the fuel flow injected into the engine 18, in order to keep the engine 18 in operation and to lock the power that it outputs. The failure is then indicated to the control system of the aircraft 7 and to the pilot, so that he/she carries out an adequate maneuver and an emergency landing.

With a parallel hybrid propulsion unit of the prior art as described before, the auxiliary motor 2 can modulate the complementary power that it outputs to the propulsion device 4 and thus keep the rotational speed of the propulsion device within an acceptable range.

However, if the failure of regulation of the engine 18 occurs at the time when the engine 18 outputs a high power, the motor 2 will not be able to reduce the power output to the propulsion device and the pilot should intentionally stop the main engine to be able to stabilize the helicopter and land. Hence, the pilot must carry out a clearance maneuver, then an emergency landing, while doing without the power that the main engine 18 can still supply.

Hence, in the event of failure of the regulation system 5 of the main engine 18, it would be advantageous to be able to modulate the power output by the main engine in order to adapt it to the needs of the aircraft, while regulating the rotational speed of the propulsion device thanks to the auxiliary motor 2. In other words, it would be advantageous to be able to continue to regulate the rotational speed of the propulsion device thanks to the two motors, even in the event of failure of the regulation system of the engine 18.

DISCLOSURE OF THE INVENTION

To do so, an object of the invention is a method for controlling the rotational speed $N_p$ of a propulsion device of a hybrid propulsion unit for an aircraft, in the event of failure of the main regulation system of the heat engine of the hybrid propulsion unit, the hybrid propulsion unit comprising:
- the propulsion device and a main gearbox, capable of driving the propulsion device;
- the heat engine and at least one electric motor, mounted in parallel on the main gearbox, the heat engine being provided with a fuel circuit capable of supplying fuel into a combustion chamber of the heat engine;

a main regulation system of the heat engine, capable of regulating the rotational speed of the heat engine;

a backup regulation system of the heat engine, capable of regulating the rotational speed of the heat engine when the main regulation system fails;

a regulation system of the electric motor, capable of regulating the rotational speed of the electric motor;

a control system of the aircraft, capable of sending a speed or power setpoint to each of the regulation means of the heat engine and of the electric motor;

the method comprising, when the main regulation system of the heat engine fails and said system is locked to a fuel flow command QCarbP*, the steps of:

sending a speed setpoint $N_{M2ref}$ to the regulation system of the electric motor, so that the regulation system of the electric motor sends a power command $P_{M2*}$ to the electric motor, whereby an instantaneous power $P_{M2m}$ of the electric motor is obtained;

simultaneously, sending a rotational speed or power setpoint to the backup regulation system of the heat engine, so that the backup regulation system sends a fuel flow command QCarbAux* to the fuel circuit of the heat engine, the command QCarbAux* is selected so as to vary the fuel flow QCarb injected into the combustion chamber of the heat engine depending on whether it is desired to increase or decrease the power $P_{M1}$ of the heat engine.

The fuel flow command QCarbP* corresponds to the last power command $P_{M1}$* obtained before the total failure of the main regulation system.

According to an embodiment of the invention, a reference power setpoint of the electric motor $P_{M2ref}$* being sent to the backup regulation system of the heat engine, the fuel flow command QCarbAux* is selected by comparing the instantaneous power $P_{M2m}$ of the electric motor with the reference power $P_{M2ref}$, and if $P_{M2m} < P_{M2ref}$, an auxiliary fuel flow QCarbAux* is controlled such that it reduces the fuel flow QCarb injected into the combustion chamber of the heat engine, thereby reducing the power $P_{M1}$ of the heat engine;

if $P_{M2m} > P_{M2ref}$, an auxiliary fuel flow QCarbAux* such that it increases the fuel flow QCarb injected into the combustion chamber of the heat engine, thereby increasing the power $P_{M1}$ of the heat engine;

if $P_{M2m} = P_{M2ref}$, the flow command QCarbAux* is kept constant.

The reference power $P_{M2ref}$ is selected so as to modulate the power output by the heat engine with a sufficient control margin.

The term "control margin" refers to the maximum authority of the electric motor to vary the total power output to the propulsion device around the average power output by the heat engine. In other words, the electric motor and its power chain (power electronics, battery if it is powered by this means) are limited by design within a bounded power range. This range can only be positive or also extend in a negative domain if the power chain of the electric motor is capable of drawing power from the main gearbox (for example by recharging the battery). Hence, the selection of $P_{M2ref}$ allows adjusting the average power at which the electric motor will work in its operational domain. An example of a judicious selection is to position $P_{M2ref}$ at the middle of the range of the electric motor so that, in case of a rapid (positive or negative) variation of the power requirement of the propulsion device, the electric motor has the maximum authority to adapt to this requirement. This allows maximizing the performances of regulation of the rotational speed of the propulsion device.

According to another embodiment of the invention, a rotational speed setpoint $N_{M1ref}$ being sent to the backup regulation system of the heat engine, the instantaneous speed $N_{M1m}$ of the heat engine is measured and it is compared with the rotational speed setpoint $N_{M1ref}$:

if $N_{M1ref} < N_{M1m}$, an auxiliary fuel flow QCarbAux* is controlled such that it reduces the fuel flow QCarb injected into the combustion chamber of the heat engine, thereby reducing the power $P_{M1}$ of the heat engine;

if $N_{M1ref} > N_{M1m}$, an auxiliary fuel flow QCarbAux* is controlled such that it increases the fuel flow QCarb injected into the combustion chamber of the heat engine, thereby increasing the power $P_{M1}$ of the heat engine; and if $N_{M1ref} = N_{M1m}$, the flow command QCarbAux* is kept constant;

and simultaneously, the instantaneous power $P_{M2m}$ of the electric motor is compared with the reference power $P_{M2ref}$, and if $P_{M2m} < P_{M2ref}$, the rotational speed setpoint of the heat engine $N_{M1ref}$ is reduced;

if $P_{M2m} > P_{M2ref}$, the rotational speed setpoint of the heat engine $N_{M1ref}$ is raised.

The invention also relates to a device for regulating the rotational speed ($N_p$) of a propulsion device of a hybrid propulsion unit for an aircraft, in the event of failure of the main regulation system of the heat engine of the hybrid propulsion unit, the hybrid propulsion unit comprising:

the propulsion device and a main gearbox, capable of driving the propulsion device;

the heat engine and at least one electric motor, mounted in parallel on the main gearbox, the heat engine being provided with a fuel circuit capable of transferring fuel into a combustion chamber of the heat engine;

a main regulation system of the heat engine, capable of regulating the rotational speed of the heat engine;

a backup regulation system of the heat engine, capable of regulating the rotational speed of the heat engine when the main regulation system fails;

a regulation system of the electric motor, capable of regulating the rotational speed of the electric motor;

a control system of the aircraft, capable of sending a speed or power setpoint to each of the regulation means of the heat engine and of the electric motor; the device further comprising, when the main regulation system of the heat engine fails and said system is locked to a fuel flow command QCarbP*, means configured to:

send a speed setpoint $N_{M2ref}$ to the regulation system of the electric motor, so that the regulation system of the electric motor sends a power command $P_{M2}$* to the electric motor, whereby an instantaneous power $P_{M2m}$ of the electric motor is obtained;

simultaneously, send a rotational speed or power setpoint to the backup regulation system of the heat engine, so that the backup regulation system sends a fuel flow command QCarbAux* to the fuel circuit of the heat engine, the command QCarbAux* is selected so as to vary the fuel flow QCarb injected into the combustion chamber of the engine depending on whether it is desired to increase or decrease the power $P_{M1}$ of the heat engine.

According to one variant, a reference power setpoint of the electric motor $P_{M2ref}*$ being sent to the backup regulation system of the heat engine, the fuel flow command QCarbAux* is selected by comparing the instantaneous power $P_{M2m}$ of the electric motor with the reference power $P_{M2ref}$, and wherein the device comprises means configured to:

- if $P_{M2m} < P_{M2ref}$, control an auxiliary fuel flow QCarbAux* such that it reduces the fuel flow QCarb injected into the combustion chamber of the heat engine, thereby reducing the power $P_{M1}$ of the heat engine;
- if $P_{M2m} > P_{M2ref}$, control an auxiliary fuel flow QCarbAux* such that it increases the fuel flow QCarb injected into the combustion chamber of the heat engine, thereby increasing the power $P_{M1}$ of the heat engine;
- if $P_{M2m} = P_{M2ref}$, keep the flow command QCarbAux* constant.

According to another variant, a rotational speed setpoint $N_{M1ref}$ being sent to the backup regulation system of the heat engine, the instantaneous speed $N_{M1m}$ of the heat engine is measured and it is compared with the rotational speed setpoint $N_{M1ref}$ and wherein the device comprises means configured to:

- if $N_{M1ref} < N_{M1m}$, control an auxiliary fuel flow QCarbAux* such that it reduces the fuel flow QCarb injected into the combustion chamber of the heat engine, thereby reducing the power $P_{M1}$ of the heat engine;
- if $N_{M1ref} > N_{M1m}$, control an auxiliary fuel flow QCarbAux* such that it increases the fuel flow QCarb injected into the combustion chamber of the heat engine, thereby increasing the power $P_{M1}$ of the heat engine; and
- if $N_{M1ref} = N_{M1m}$, keep the flow command QCarbAux* constant;

and simultaneously, compare the instantaneous power $P_{M2m}$ of the electric motor with the reference power $P_{M2ref}$, and

- if $P_{M2m} < P_{M2ref}$, reduce the rotational speed setpoint of the heat engine $N_{M1ref}$;
- if $P_{M2m} > P_{M2ref}$, raise the rotational speed setpoint of the heat engine $N_{M1ref}$.

The invention also relates to a computer program product comprising instructions which, when the program is executed by a computer, cause the latter to implement the method as described hereinabove.

BRIEF DESCRIPTION OF THE DRAWINGS

Other aspects, aims, advantages and features of the invention will appear better upon reading the following detailed description of preferred embodiments of the latter, given as a non-limiting example, and made with reference to the appended drawings, wherein.

DETAILED DISCLOSURE OF PARTICULAR EMBODIMENTS

The solution proposed by the invention is an architecture for controlling the rotational speed of a propulsion device, which allows continuing to modulate the power output by the two motors, despite the failure of the main regulation system of the heat engine.

This solution may be applied to any parallel hybrid propulsion unit where at least one electric motor and at least one heat engine (for example a gas turbine) drive, in parallel, a gearbox to a propulsion device, which may be, for example, a rotor, a propeller of a turboprop engine, or a fan of a turbojet engine. For example, this architecture may allow controlling the rotational speed of a helicopter rotor.

The method for modulating the power of the engine 1 according to the invention is not restrictive in terms of physical implementation of the different regulation systems.

Figure 2:
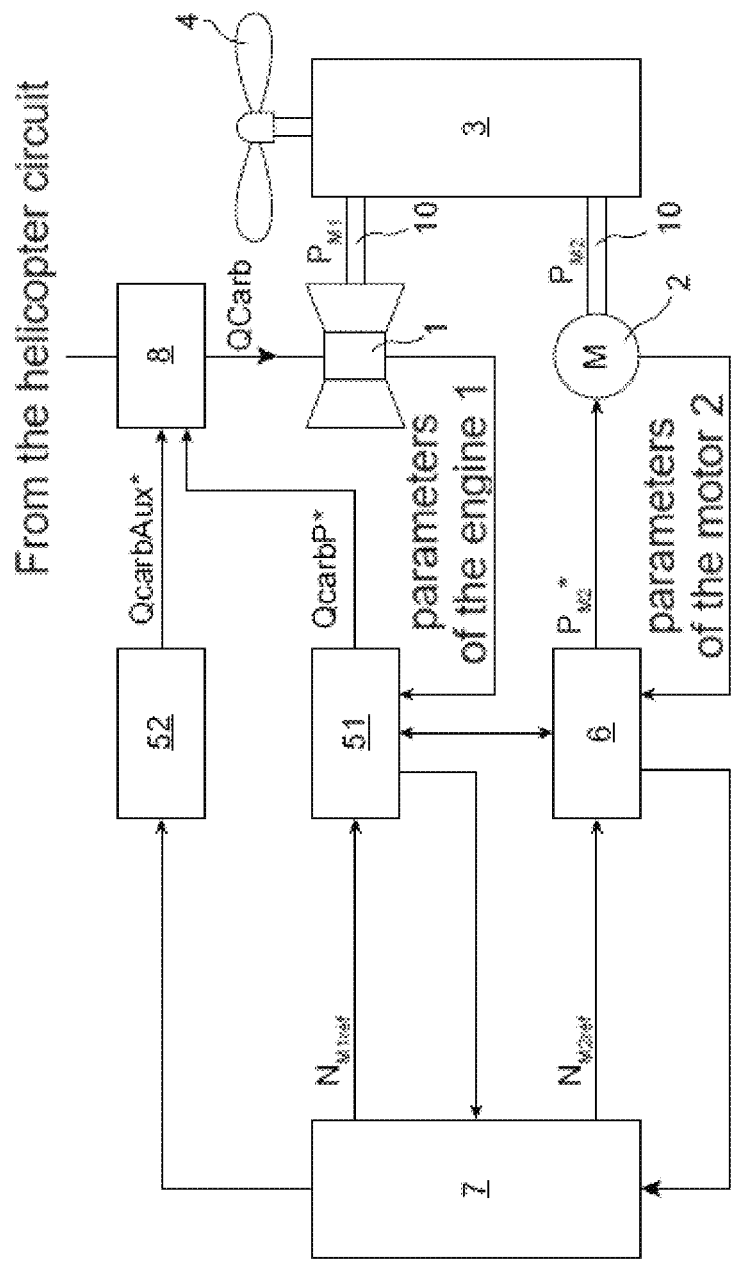
FIG. 2 shows an example of a parallel hybrid architecture used by the method according to the invention.

A particularly advantageous, yet non-limiting, implementation of the invention is described in FIG. 2.

Figure 1:
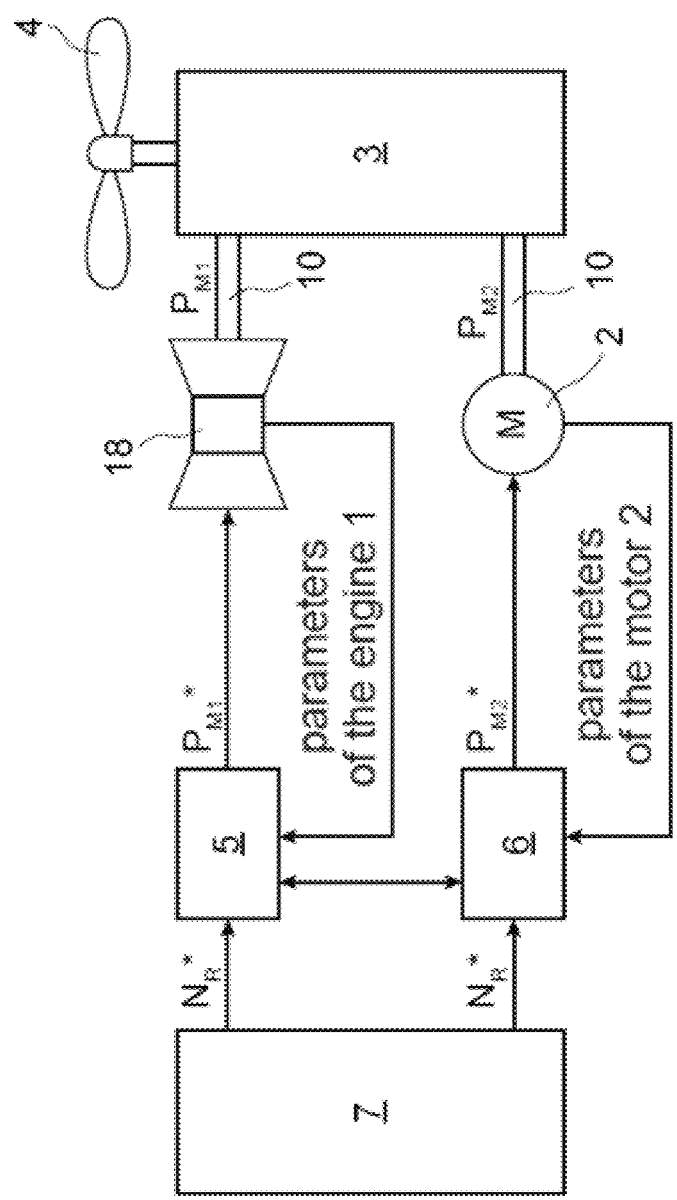
FIG. 1 shows an example of a parallel hybrid architecture according to the prior art.

In FIG. 2, the parallel hybrid propulsion unit includes, as in FIG. 1, a main gearbox 3, a propulsion device 4, a main heat engine (engine 1), a secondary electric engine (motor 2), a regulation system 6 of the motor 2, and a control system 7 of the aircraft.

Unlike FIG. 1 of the prior art, the regulation system 5 of the engine 1 is herein replaced by a main regulation system 51 of the engine 1 capable of regulating the rotational speed of the engine 1 by modulating the power output by the engine 1 through the main fuel flow command QCarbP* sent to the fuel circuit 8 of the engine 1. this main fuel flow command QCarbP* varies the fuel flow QCarb that is injected into the combustion chamber of the engine 1. It should be noted that the references 1 (heat engine) and 8 (fuel circuit) of FIG. 2 correspond, with a more accurate level of details, to the reference 18 of FIG. 1 (the heat engine 18 of FIG. 1 comprising a fuel circuit which is not shown).

There is also a backup regulation system 52 of the engine 1 capable of modulating the power $P_{M1}$ output by the engine 1, by controlling an auxiliary fuel flow QCarbAux*. The backup regulation system 52 of the engine 1 is independent of the main regulation system 51, so that a failure of the main system 51 does not at the same time affect the backup system 52.

The auxiliary fuel flow command QCarbAux* may indifferently increase or decrease the fuel flow QCarb, which is output by the fuel circuit 8 of the engine 1 and which is injected into the combustion chamber of the engine 1. Hence, this auxiliary fuel flow is added to or subtracted from the fuel flow QCarbP controlled by the main regulation system 51.

The modulation of the fuel flow QCarb, up or down with respect to the locked value QCarbP*, may be carried out by an electro-hydraulic member located in the fuel circuit 8 of the engine 1, so-called "auxiliary metering valve". An electro-hydraulic member ("main metering valve"), also located in the fuel circuit 8 of the engine 1, also modulates the fuel flow QCarb, except when the regulation system of the engine 1 fails and the command QCarbP* is blocked. The architecture of the circuit and the presence of the auxiliary metering valve allow increasing or decreasing the flow initially locked by the main metering valve. Hence, there are two different hydraulic members, respectively for the main and auxiliary metering.

The backup regulation system 52 of the engine 1 is independent of the main regulation system 51, so that a failure of the main regulation system 51 does not at the same time affect the other system.

Preferably, yet without limitation (and as shown in FIG. 2), the main regulation system 51 of the engine 1 can exchange information with the regulation system 6 of the motor 2, in order to coordinate the power output by each of the engines when they operate simultaneously. According to this particular embodiment, the main regulation system 51 of the engine 1 can act on the power output by the motor 2.

According to the architecture shown in FIG. 2, in the event of a total failure of the main regulation system 51 of the engine 1, the main fuel flow command QCarbP* is locked, but the control system of the aircraft 7 can continue to regulate the rotational speed of the propulsion device, regardless of the power output by the engine 1 when the failure occurred, thanks to:

the motor 2 and to its dedicated regulation system 6; and
the backup regulation system 52 of the engine 1.

It is assumed that, because of the failure of the main regulation system 51 of the engine 1, no more information processed by the main regulation system 51 is available. In particular, the measurement of the power output by the engine 1 $P_{M1}$, at the time when the main fuel flow QCarbP has been locked, is not available.

This backup regulation of the engine 1 by means of the backup regulation system 52 could offer degraded performances with regards to the main regulation system 51, in particular in terms of power regulation dynamics.

Also, in this failure situation, the control of the rotational speed of the propulsion device may preferably be carried out according to the following embodiment.

The backup regulation system 52 of the engine 1 is configured so that it ensures a slow modulation of the power output by the engine 1. To do so, the backup regulation system 52 modulates the auxiliary fuel flow command QCarbAux* so that the engine 1 outputs an adapted power $P_{M1}$, which may be lower than the power needs of the propulsion device. Thus, the backup regulation system 52 "coarsely" adapts the power output by the engine 1 to the flight situation of the aircraft (for example, in the case of a helicopter, climb, cruise, descent, etc.).

In parallel, and simultaneously, the regulation system 6 of the motor 2 varies rapidly and to the exact needs the power $P_{M2}$ output by the motor 2 by "finely" regulating the rotational speed of the propulsion device. The power output by the motor 2 $P_{M2}$ is then added to that one output by the engine 1 $P_{M1}$ in order to meet the needs of the propulsion device. Thus, the total power output to the propulsion device profits from the rapid dynamics of the motor 2 to meet the needs of instantaneous power variations of the propulsion device.

The "slow" nature of the real-time adaptation of the command QCarbAux* enables the motor 2 (faster than the engine 1) to perfectly compensate for the additional power supplied to the rotor with the command $P_{M2*}$. The fact that the variations of the engine 1 are slow allows avoiding risks of dynamic disturbances between the regulation of the two motors, which would generate power and/or speed oscillations of the propulsion device 4, which is detrimental to piloting.

The slow modulation of the power output by the engine 1 $P_{M1}$ may be carried out by determining the power needs of the aircraft. To do so, this determination may be based on one or more element(s) listed hereinbelow without limitation:

a command or a measurement of the collective pitch of the aircraft;
an anticipated power piece of information originating from the aircraft;
the power output by the motor 2 $P_{M2}$, averaged over a given duration;
any other piece of information allowing estimating the average level of the power requirement of the propulsion device.

Figure 3:
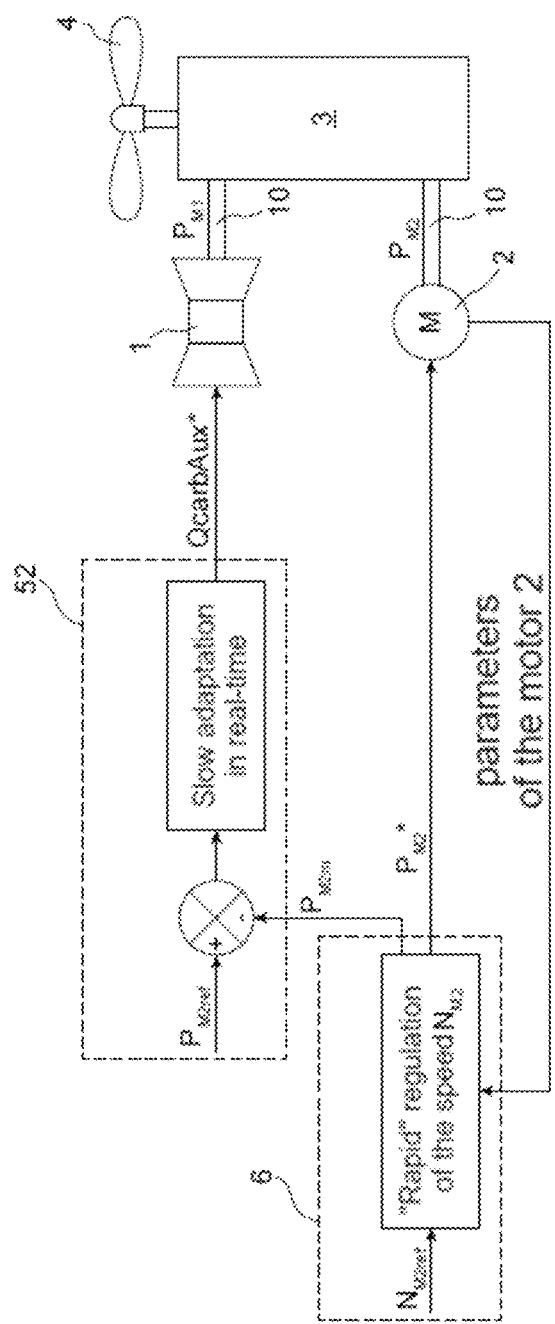
FIG. 3 shows a detail of the parallel hybrid architecture used by the method according to the invention in one embodiment.

An advantageous solution for modulating the power of the engine 1 $P_{M1}$ is described in FIG. 3. It consists in regulating the rotational speed of the propulsion device through the regulation of the rotational speed $N_{M2}$ of the motor 2. This regulation may be "rapid", in order to effectively vary the power output to the propulsion device around an average power.

The instantaneous power of the motor 2 $P_{M2m}$, necessary for maintaining the rotational speed of the propulsion device on its setpoint, is used by the backup regulation system 52 of the engine 1 to compare it with a reference power $P_{M2ref}$ selected by design to guarantee a satisfactory flight margin. Thus:

if the instantaneous power output by the motor 2 $P_{M2m}$ is lower than the reference power $P_{M2ref}$, the backup regulation system 52 of the engine 1 controls an auxiliary fuel flow QCarbAux* such that it reduces the fuel flow QCarb injected into the combustion chamber of the engine 1;
conversely, if the instantaneous power output by the motor 2 $P_{M2m}$ is higher than the reference power $P_{M2ref}$, the backup regulation system 52 controls an auxiliary fuel flow QCarbAux* such that it increases the fuel flow QCarb injected into the combustion chamber of the engine 1, thereby increasing the power of the engine 1.

QCarbAux* is an auxiliary fuel flow command of the engine 1 which is adapted to the average needs of the propulsion device. This command QCarbAux* may be negative, in order to reduce the power of the engine 1 below the power that it displayed when the failure of the main regulation system 51 occurred, or positive.

It should be noted that this method of slow modulation of the power output by the engine 1 according to this embodiment does not use any information on the state of the engine 1. Hence, this embodiment does not require any measurement means dedicated to the backup system.

This slow modulation of the power output by the engine 1 $P_{M1}$ is intended to keep the average power output by the motor 2 at a selected level, for example at the middle of the power range of the motor 2. This choice allows maximizing the amplitude of rapid variation of the power of the propulsion device. The regulation of the power of the engine 1 should be slow enough:

so as to be compatible with the operation of the backup regulation system of the engine 1; and
so that the modulation of the power of the engine 1 does not disturb the regulation of the rotational speed of the motor 2.

The main advantages of this method of slow modulation of the power output by the engine 1 proposed in the context of the invention are:

being able to keep the main engine (herein, the engine 1) in operation, regardless of the power level at which it was when the failure of the main regulation system occurs;
offering the maximum power margin to the pilot in order to conduct the end of the flight until landing, which guarantees the maximum safety;
guaranteeing the stability of the regulation of the rotational speed of the propulsion device thanks to the frequency decoupling between the two motors, namely the slow modulation of the power of the engine 1 and the rapid regulation of the rotational speed by the motor 2;

minimizing the power demanded from the motor 2, which also minimizes the power drawn from the battery which supplies it and thus increases its autonomy. This aspect has two interests, namely, on the one hand, enabling the pilot to have more time, and therefore a longer crossable distance, to conduct the emergency landing (safety interest) and, on the other hand, the autonomy offered could also enable the pilot to complete his/her flight until reaching his/her scheduled end point, or to return to the starting base in order to be able to carry out the necessary maintenance operations (operational interest).

As specified before, the method for modulating the power of the engine 1 as described in FIG. 3 is a particularly advantageous yet non-limiting implementation and it may take on different forms. Indeed, the proposed invention is not restrictive in terms of physical implementation of the aforementioned different regulation systems.

Thus, the backup regulation system 52 of the engine 1 may, for example, form part of the engine 1 itself or be integrated into the control system 7 of the aircraft.

In turn, the regulation of the rotational speed of the propulsion device in the event of failure of the main regulation system 51 of the engine 1 may be implemented, for example, in the regulation system of the motor 2 or in the control system of the aircraft.

The regulation system 6 of the motor 2 may, itself, be part (partially or totally) of the control system 7 of the aircraft.

Among the other forms of implementation mentioned hereinabove, mention may be made of present the embodiment described in FIG. 4. In this case, the backup regulation system 52 of the engine 1 regulates the rotational speed of the engine 1 on the setpoint $N_{M1ref}$. To do so, it uses a rotational speed measurement chain 9 of the free turbine of the engine 1, which is independent of any measurement means of the main regulation system 51 and which measures the rotational speed of the engine 1 $N_{M1}$. According to another embodiment which is not shown, it is also possible to use a rotational speed measurement chain of the propulsion device 4.

Unlike conventional turboshaft engines (without parallel hybridization), the rotational speed setpoint $N_{M1ref}$ is, in this embodiment, regulated according to the instantaneous power output by the motor 2 $P_{M2m}$, in order to keep the latter at a desired level, according to the same selection criteria as the embodiment described in FIG. 3.

Thus:

when the instantaneous power of the motor 2 $P_{M2m}$ is higher than the desired level (reference power $P_{M2ref}$), the rotational speed setpoint of the engine 1 $N_{M1ref}$ is raised so that the engine 1 outputs more power;

and conversely, when the instantaneous power of the motor 2 $P_{M2m}$ is too low, the rotational speed setpoint of the engine 1 $N_{M1ref}$ is reduced, so that the engine 1 outputs less power.

Figure 4:
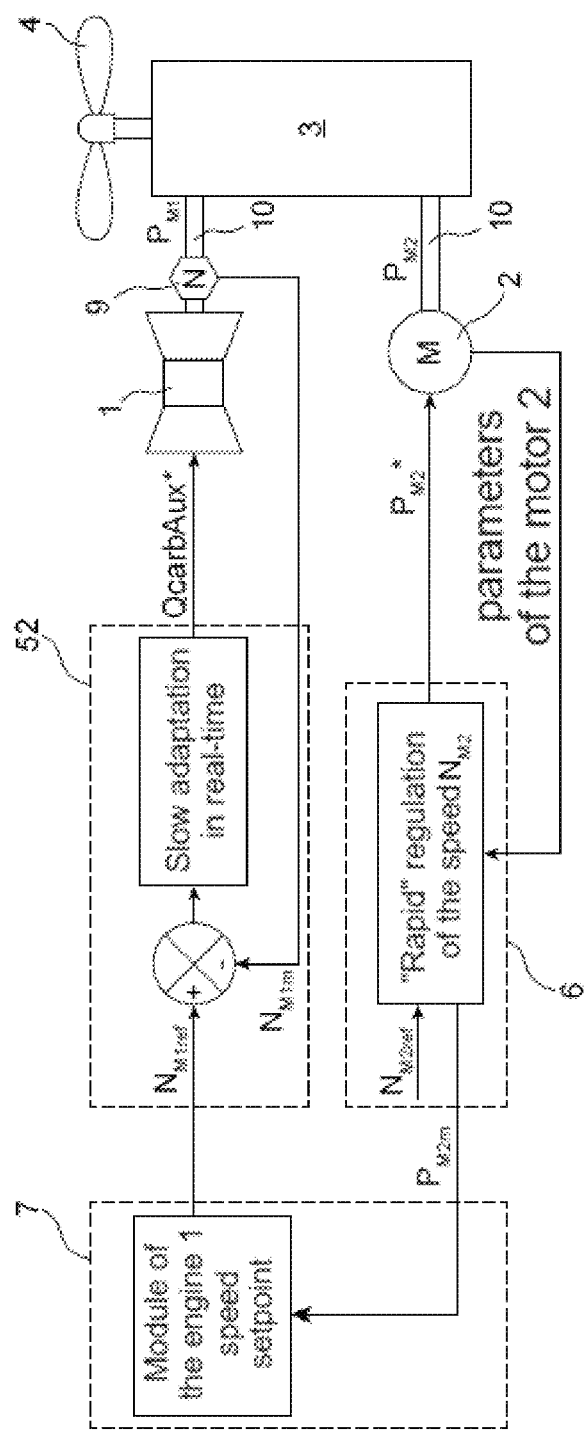
FIG. 4 shows a detail of the parallel hybrid architecture used by the method according to the invention in another embodiment.

In FIG. 4, the regulation of the speed setpoint of the engine 1 takes place in the control system 7 of the aircraft.

The comparison between $P_{M2m}$ and $P_{M2ref}$ is herein done in the block 7 "Modulation of the speed setpoint of the engine 1" of FIG. 4. The comparison scheme is the same as the block 52 of FIG. 3, with the difference that the output is the rotational speed setpoint of the engine 1 $N_{M1ref}$, instead of being the auxiliary flow command QCarbAux*.

The comparison between $N_{M1ref}$ and $N_{M1}$ is the operation which allows determining the auxiliary flow command QCarbAux*. The embodiment illustrated in FIG. 4 is less direct than that of FIG. 3 since it involves two nested regulation loops: a first power loop $P_{M2}$ which generates the setpoint $N_{M1ref}$, and a second speed loop to finally generate the auxiliary flow command QCarbAux*. This embodiment has the advantage that it allows using the backup regulation system of the engine 1 (the block 52 of FIG. 4).

It should be noted that some elements that are present in FIG. 2 have not been shown in FIGS. 3 and 4, for example the control system of the aircraft in FIG. 3, and the main regulation system of the engine 1 in FIGS. 3 and 4. These elements are actually present in the hybrid propulsion unit according to the invention, but have not been shown in order to facilitate reading of FIGS. 3 and 4.

The invention claimed is:

1. A method for controlling the rotational speed ($N_p$) of a propulsion device of a hybrid propulsion unit for an aircraft, in the event of failure of the main regulation system of the heat engine of the hybrid propulsion unit, the hybrid propulsion unit comprising:

the propulsion device and a main gearbox, capable of driving the propulsion device;

the heat engine and at least one electric motor, mounted in parallel on the main gearbox, the heat engine being provided with a fuel circuit capable of supplying fuel into a combustion chamber of the heat engine;

a main regulation system of the heat engine, capable of regulating the rotational speed of the heat engine;

a backup regulation system of the heat engine, capable of regulating the rotational speed of the heat engine when the main regulation system fails;

a regulation system of the electric motor, capable of regulating the rotational speed of the electric motor;

a control system of the aircraft, capable of sending a speed or power setpoint to each of the regulation systems of the heat engine and of the electric motor;

the method comprising, when the main regulation system of the heat engine fails and said system is locked to a fuel flow command QCarbP*, the control system is performing the steps of:

sending a speed setpoint $N_{M2ref}$ to the regulation system of the electric motor, so that the regulation system of the electric motor sends a power command $P_{M2*}$ to the electric motor, whereby an instantaneous power $P_{M2m}$ of the electric motor is obtained;

simultaneously, sending a rotational speed or power setpoint to the backup regulation system of the heat engine, so that the backup regulation system sends a fuel flow command QCarbAux* to the fuel circuit of the heat engine, the command QCarbAux* is selected so as to vary the fuel flow QCarb injected into the combustion chamber of the heat engine depending on whether it is desired to vary the power $P_{M1}$ Of the heat engine; and controlling the rotational speed ($N_p$) of a propulsion device by controlling an auxiliary fuel flow QCarbAux* and the fuel flow QCarb injected into a combustion chamber of the heat engine.

2. The method according to claim 1, wherein, a reference power setpoint of the electric motor $P_{M2ref}$, being sent to the backup regulation system of the heat engine, the fuel flow command QCarbAux* is selected by comparing the instantaneous power $P_{M2m}$ of the electric motor with the reference power $P_{M2ref}$, and if $P_{M2m}<P_{M2ref}$, an auxiliary fuel flow QCarbAux* is controlled such that it reduces the fuel flow QCarb injected into the combustion chamber of the heat engine, thereby reducing the power $P_{M1}$ of the heat engine;

if $P_{M2m}>P_{M2ref}$, an auxiliary fuel flow QCarbAux* such that it increases the fuel flow QCarb injected into the combustion chamber of the heat engine, thereby increasing the power $P_{M1}$ of the heat engine;

if $P_{M2m}=P_{M2ref}$, the flow command QCarbAux* is kept constant.

3. The method according to claim 1, wherein a rotational speed setpoint $N_{M1ref}$ being sent to the backup regulation system of the heat engine, the instantaneous speed $N_{M1m}$ of the heat engine is measured and it is compared with the rotational speed setpoint $N_{M1ref}$:

if $N_{M1ref}<N_{M1m}$, an auxiliary fuel flow QCarbAux* is controlled such that it reduces the fuel flow QCarb injected into the combustion chamber of the heat engine, thereby reducing the power $P_{M1}$ of the heat engine;

if $N_{M1ref}>N_{M1m}$, an auxiliary fuel flow QCarbAux* is controlled such that it increases the fuel flow QCarb injected into the combustion chamber of the heat engine, thereby increasing the power $P_{M1}$ of the heat engine; and if $N_{M1ref}=N_{M1m}$, the flow command QCarbAux* is kept constant;

and simultaneously, the instantaneous power $P_{M2m}$ of the electric motor is compared with the reference power $P_{M2ref}$, and if $P_{M2m}<P_{M2ref}$, the rotational speed setpoint of the heat engine $N_{M1ref}$ is reduced;

if $P_{M2m}>P_{M2ref}$, the rotational speed setpoint of the heat engine $N_{M1ref}$ is raised.

4. A control device for regulating the rotational speed ($N_p$) of a propulsion device of a hybrid propulsion unit for an aircraft in the event of failure of the main regulation system of the heat engine of the hybrid propulsion unit, the hybrid propulsion unit comprising:

the propulsion device and a main gearbox, configured to drive the propulsion device;

the heat engine and at least one electric motor, mounted in parallel on the main gearbox, the heat engine being provided with a fuel circuit configured to transfer fuel into a combustion chamber of the heat engine;

a main regulation system of the heat engine, configured to regulate the rotational speed of the heat engine;

a backup regulation system of the heat engine, configured to regulate the rotational speed of the heat engine when the main regulation system fails;

a regulation system of the electric motor, configured to regulate the rotational speed of the electric motor;

a control system of the aircraft, configured to send a speed or power setpoint to each of the regulation systems of the heat engine and of the electric motor;

wherein, when the main regulation system of the heat engine fails and said system is locked to a fuel flow command QCarbP*, the control device is configured to:

send a speed setpoint $N_{M2ref}$ to the regulation system of the electric motor, so that the regulation system of the electric motor sends a power command $P_{M2*}$ to the electric motor, whereby an instantaneous power $P_{M2m}$ of the electric motor is obtained;

simultaneously, send a rotational speed or power setpoint to the backup regulation system of the heat engine, so that the backup regulation system sends a fuel flow command QCarbAux* to the fuel circuit of the heat engine, the command QCarbAux* is selected so as to vary the fuel flow QCarb injected into the combustion chamber of the engine depending on whether it is desired to increase or decrease the power $P_{M1}$ of the heat engine; and control the rotational speed ($N_p$) of a propulsion device by controlling an auxiliary fuel flow QCarbAux* and the fuel flow QCarb injected into a combustion chamber of the heat engine.

5. The control device according to claim 4, wherein, a reference power setpoint of the electric motor $P_{M2ref}$* being sent to the backup regulation system of the heat engine, the fuel flow command QCarbAux* is selected by comparing the instantaneous power $P_{M2m}$ of the electric motor with the reference power $P_{M2ref}$, and wherein the control device is configured to:

if $P_{M2m}<P_{M2ref}$, control an auxiliary fuel flow QCarbAux* such that it reduces the fuel flow QCarb injected into the combustion chamber of the heat engine, thereby reducing the power $P_{M1}$ of the heat engine;

if $P_{M2m}>P_{M2ref}$, control an auxiliary fuel flow QCarbAux* such that it increases the fuel flow QCarb injected into the combustion chamber of the heat engine, thereby increasing the power $P_{M1}$ of the heat engine;

if $P_{M2m}=P_{M2ref}$, keep the flow command QCarbAux* constant.

6. The control device according to claim 4, wherein a rotational speed setpoint $N_{M1ref}$ being sent to the backup regulation system of the heat engine, the instantaneous speed $N_{M1m}$ of the heat engine is measured and it is compared with the rotational speed setpoint $N_{M1ref}$ and wherein the control device is configured to:

if $N_{M1ref}<N_{M1m}$, control an auxiliary fuel flow QCarbAux* such that it reduces the fuel flow QCarb injected into the combustion chamber of the heat engine, thereby reducing the power $P_{M1}$ of the heat engine;

if $N_{M1ref}>N_{M1m}$, control an auxiliary fuel flow QCarbAux* such that it increases the fuel flow QCarb injected into the combustion chamber of the heat engine, thereby increasing the power $P_{M1}$ of the heat engine; and if $N_{M1ref}=N_{M1m}$, keep the flow command QCarbAux* constant;

and simultaneously, compare the instantaneous power $P_{M2m}$ of the electric motor with the reference power $P_{M2ref}$, and if $P_{M2m}<P_{M2ref}$, reduce the rotational speed setpoint of the heat engine $N_{M1ref}$;

if $P_{M2m}>P_{M2ref}$, raise the rotational speed setpoint of the heat engine $N_{M1ref}$.

7. A non-transitory computer readable medium for storing a computer program comprising instructions which, when the program is executed by a computer, cause the computer to perform the steps of:

sending a speed setpoint $N_{M2ref}$ to an regulation system of an electric motor, so that the regulation system of the electric motor sends a power command $P_{M2*}$ to the electric motor, whereby an instantaneous power $P_{M2m}$ of the electric motor is obtained;

simultaneously, sending a rotational speed or power setpoint to a backup regulation system of the heat engine, so that the backup regulation system sends a fuel flow command QCarbAux* to a fuel circuit of the heat engine, the command QCarbAux* is selected so as to vary the fuel flow QCarb injected into a combustion chamber of the heat engine depending on whether it is desired to vary the power $P_{M1}$ of the heat engine; and controlling the rotational speed ($N_p$) of a propulsion device by controlling an auxiliary fuel flow QCarbAux* and the fuel flow QCarb injected into a combustion chamber of the heat engine.

* * * * *